Figure 1:
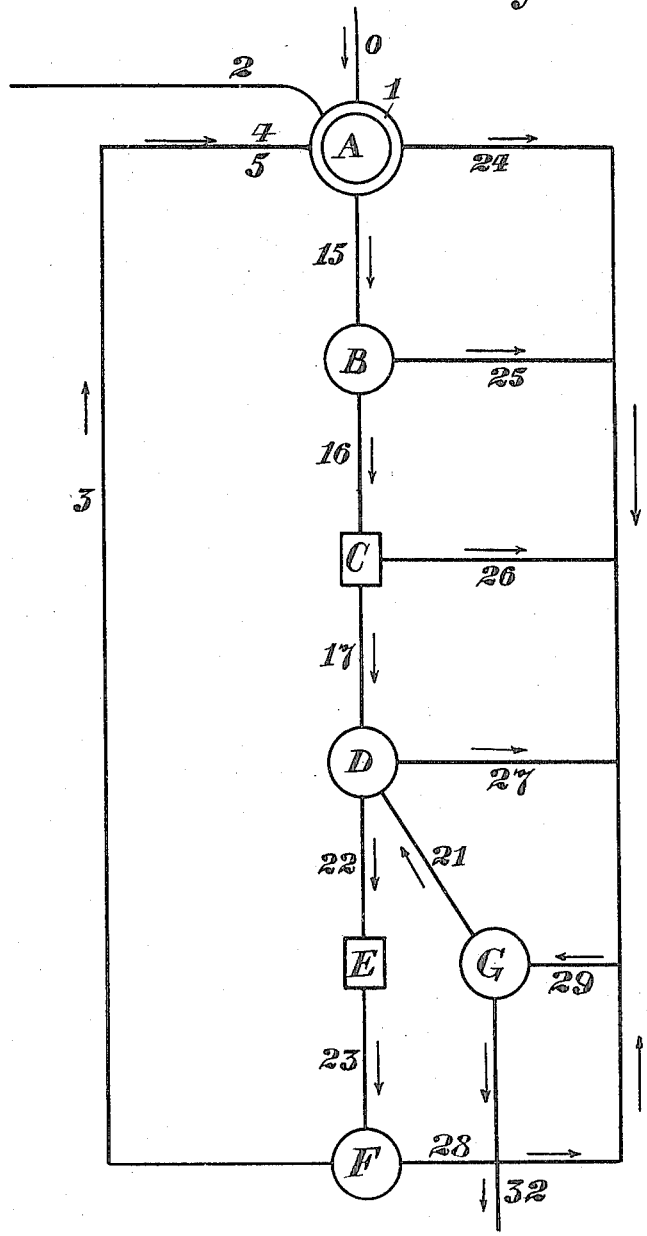

H. M. LESLIE.
EXTRACTION OF METALS FROM THEIR ORES.
APPLICATION FILED DEC. 30, 1911.

1,158,514.

Patented Nov. 2, 1915.
3 SHEETS—SHEET 1.

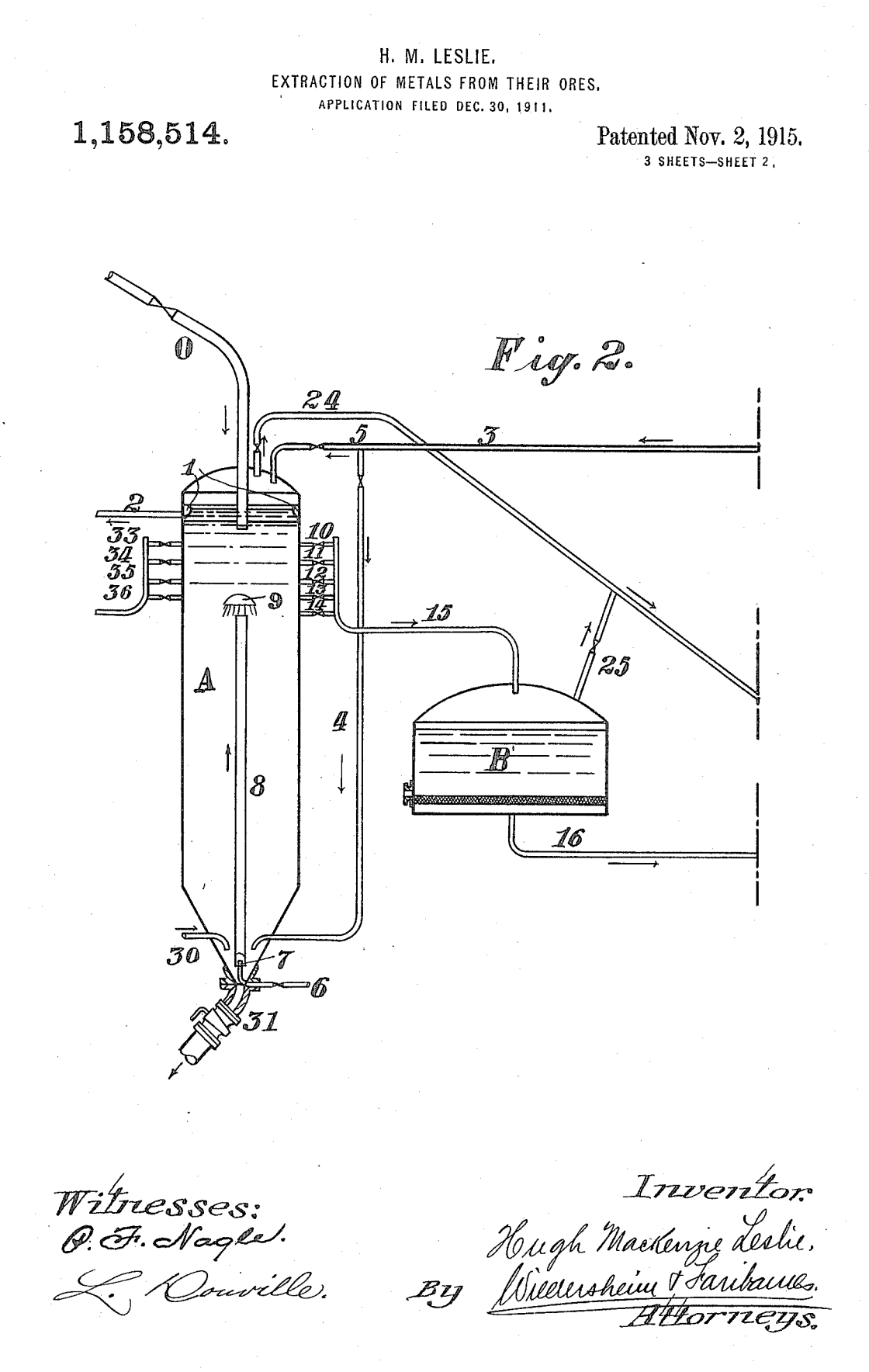

H. M. LESLIE.
EXTRACTION OF METALS FROM THEIR ORES.
APPLICATION FILED DEC. 30, 1911.

1,158,514.

Patented Nov. 2, 1915.
3 SHEETS—SHEET 2.

Fig. 2.

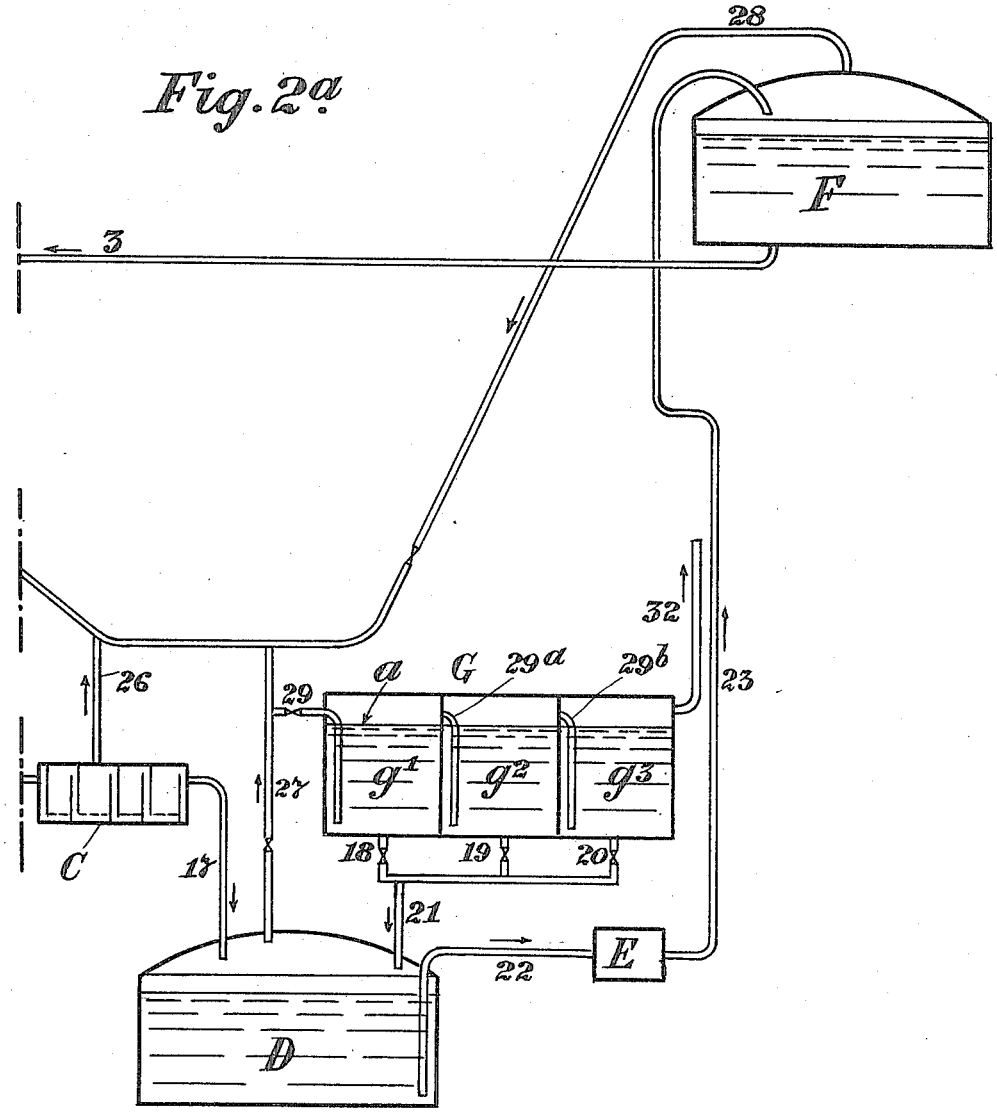

UNITED STATES PATENT OFFICE.

HUGH M. LESLIE, OF GLASGOW, SCOTLAND.

EXTRACTION OF METALS FROM THEIR ORES.

1,158,514.     Specification of Letters Patent.     Patented Nov. 2, 1915.

Application filed December 30, 1911. Serial No. 668,740.

*To all whom it may concern:*

Be it known that I, HUGH MACKENZIE LESLIE, metallurgical engineer, a subject of the King of Great Britain, residing at Glasgow, Scotland, have invented certain new and useful Improvements in the Extraction of Metals from Their Ores, of which the following is a specification.

This invention relates to the cyanid process of extracting metals from their ores and it has for its object to improve the same.

It is a well known fact that in the cyanid process as at present carried out, very considerable loss of cyanid occurs. The cause of this loss has been ascribed to, and associated with, the material under treatment, whereby reactions are set up between the cyanid and cyanicids (*i. e.* cyanid destroying bodies) present in the material, and partly to the chemical action of the atmosphere, or the air, used in carrying out the process.

The following are typical reactions and are often quoted as representing what is commonly supposed to take place:

(1) For cyanicids in the ore:

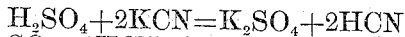
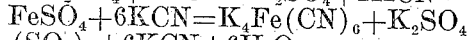
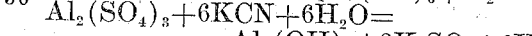
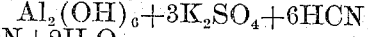
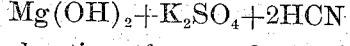

$$H_2SO_4 + 2KCN = K_2SO_4 + 2HCN$$
$$FeSO_4 + 6KCN = K_4Fe(CN)_6 + K_2SO_4$$
$$Al_2(SO_4)_3 + 6KCN + 6H_2O = Al_2(OH)_6 + 3K_2SO_4 + 6HCN$$
$$MgSO_4 + 2KCN + 2H_2O = Mg(OH)_2 + K_2SO_4 + 2HCN$$

(2) Chemical action of atmospheric air:

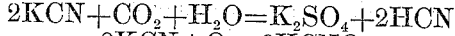
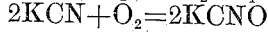

$$2KCN + CO_2 + H_2O = K_2SO_4 + 2HCN$$
$$2KCN + O_2 = 2KCNO$$

According to these reactions the loss of cyanid takes place while the cyanid is actually in contact with the material undergoing treatment and is mainly due to the formation and evolution of hydrocyanic acid (HCN). It is, however, well known to those skilled in the art, that the deleterious effect of such cyanicids can be neutralized by the addition of some neutralizing agent.

I have carried out extensive and numerous research experiments on this question of the loss of cyanid in the cyanid process, and have demonstrated that outside of the action of cyanicids such as those cited and generally accepted, the principal loss is due to the formation of hydrocyanic acid by hydrolysis of the simple cyanid solution in accordance with the following equation:

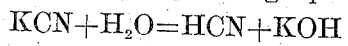

$$KCN + H_2O = HCN + KOH$$

The hydrocyanic acid thus formed is constantly evolved at all stages of the process and I have conclusively proved from my experiments that cyanid in solution, contained in open vessels will be completely decomposed and the cyanogen present completely evolved as hydrocyanic acid and thus lost. The reaction is not reversible as follows:

$$HCN + KOH = KCN + H_2O$$

and I have further demonstrated that even a large excess of KOH (caustic potash) or any other caustic alkali present will not prevent this hydrolytic action from taking place. Further my experiments prove that this loss by hydrolysis goes on continuously at all stages and from all vessels containing cyanid in solution in the present way of carrying out the process and that the higher the temperature the greater the loss in any given time.

Under my invention I cover all, or as many as may be desired, of the tanks, vats, extractor boxes, machines or places whose cyanogen compounds (hydrogen cyanid, potassium or sodium cyanid or other cyanid) in gas or solution are found, contained, or are used, in or for, the purpose of extraction, in such a manner as to prevent the gases arising in these said places from evaporating or diffusing into the atmosphere. From these covered places the gases are carried off (by suction or otherwise) and conducted to one or more regenerating vessels where they are subjected to the action of an alkaline hydrate or carbonate (preferably caustic soda or potash, although, in some cases, I may advantageously use ammonium hydrate) and in this manner I fix the hydrocyanic acid in the gases as an alkaline cyanid and render them suitable for re-use. From the regenerating vessel or vessels the regenerated cyanid solution is drawn off as required and added to the sump so as to strengthen the solution therein. Solution from the sump is pumped to a reservoir from which solution is conducted, as required, to the vessel or vessels in which the ore pulp is undergoing treatment. In this manner it will be seen that the hydrocyanic acid gas which is continuously evolving at all stages of the process is not allowed to escape from any of the vessels containing cyanogen compounds into the atmosphere but is continuously being regenerated into a simple cyanid solution and continuously being re-used as such again in the treatment. In this manner the amount of cyanid required is very much reduced from present practice as practically very little loss of cyanid will take place, any of the cyanogen radical in the cyanid that is converted into hydrocyanic acid being re-converted and used over again this conversion and re-conversion going on automatically over and over again so long as the process is carried on. The invention also includes improvements in the construction and arrangement of the plant.

In order that the invention may be clearly understood I have hereunto appended, simply by way of illustration or example, drawings showing diagrammatically a convenient construction of plant for carrying out the improved process.

Figure 1 is a plan and Figs. 2 and 2$^a$ are elevation of a single unit, of which there may be several in the plant.

Referring to the drawings, the ore pulp from the mill is conducted by pipe O to a combined pulp collector, dewatering device and agitator A in which the pulp is allowed to settle, the overflow water and slime being carried off to the slimes plant by means of the overflow circular launder 1 and the overflow pipe 2 and when the agitator A is sufficiently full the pulp feed is directed to another agitator similar to A, A being the first unit of the treatment plant. The surplus water is decanted off by means of the decanting pipes 33, 34, 35, 36, which carry the same to the slimes plant (not shown). Cyanid solution is introduced from the reservoir F by means of the pipes 3, 4, and 5 and then agitation is started by turning on the usual compressed air supply from the pipe 6, which latter is connected to the nozzle 7, thus causing the liquor and pulp to rise through the circulating pipe 8 and to strike the baffle cone 9 whereby it is distributed over the top of the charge. A continuous circulation is in this manner carried on. When the agitation has proceeded long enough it is stopped and the pulp is allowed to settle and the liquor is decanted off by the decantation pipes 10, 11, 12, 13, 14, and led to the filter B by the pipe 15. From thence it passes, by means of the pipe 16, to the extractor C (where the metal is precipitated from the solution) and it then passes to the sump D by the pipe 17. The strength of the solution is kept up in the sump D by the addition thereto of regenerated cyanid solution from the regenerator G through the pipes 18, 19, 20, 21. From the sump the solution can be pumped to the reservoir F by means of the pump E and the pipes 22, 23, and from the reservoir the solution is drawn off from time to time as required and supplied to the agitator A. The vessels A, B, C, D, and F are covered over and the gases evolved therein are conducted by the pipes 24, 25, 26, 27, 28, 29, to the regenerator G where the hydrocyanic acid is converted into a simple cyanid by being brought into contact with a suitable alkaline hydrate or carbonate such as caustic soda or potash. The gas after passing through the absorbing alkali and thus freed from its hydrocyanic acid finds its way to the atmosphere by means of the pipe 32. Each wash or liquor necessary for the treatment of the charge in A is treated in the same manner and when the metal has been extracted and the charge is ready for discharge, water is introduced from the water supply pipe 30, agitation is again started and the discharge valve at 31 is opened and the charge run to the waste dam.

The regenerator preferably consists of a closed tank divided into three compartments $g^1$, $g^2$, $g^3$, each compartment being filled, to the level $a$, with, say, a solution of either caustic soda or caustic potash. The gases, evolved or given off during the cyanid treatment and collected from the various covered places are conducted to the tank G by means of a pipe 29. The pipe 29 dips to near the bottom of the compartment $g^1$ and the gases pass up through the solution and collect at the top and pass again by the pipe 29$^a$ into the compartment $g^2$ where they are subjected to the action of the solution in this compartment. The gases finally pass from the compartment $g^2$ to the compartment $g^3$ by the pipe 29$^b$ and are subjected to the action of the solution for the third time. From the compartment $g^3$ they can pass off into the atmosphere (or elsewhere) by a pipe 32. The solution containing the regenerated cyanid is drawn off as, and when required, by the pipes 18, 19, 20.

This invention is applicable to any of the known methods of treating ores by means of cyanogen compounds for the recovery of metals, namely, percolation, agitation, decantation, or other method whereby the metal is recovered by using a cyanogen compound and in which the cyanogen compound used is decomposed and liberates gas containing hydrocyanic acid.

Any number of combined agitators, pulp collectors and dewatering devices may be used, the number of filters, extractors, sumps, reservoirs, pumps and regenerators being adapted to suit the requirements of the plant.

It is to be understood that I do not confine myself to the construction or arrangement of plant shown as this may obviously be changed or altered, for instance, I may use one or more ordinary agitators or percolators instead of the combined agitator, pulp collector and dewatering device A.

Having now fully described my invention what I claim and desire to secure by Letters Patent is:—

1. The improvement in the cyanid process for treating ores consisting in collecting the gases liberated at all stages of the process and conducting them continuously to a regenerating vessel wherein they are subjected to the action of an alkali so as to convert any hydrocyanic acid gas into a simple cyanid solution which latter is drawn off and added to the solution, from which the metal has been extracted, in the sump and thereafter supplied to the vessel in which the ore pulp is undergoing treatment, the arrangement constituting a closed circulatory solution system whereby the hydrocyanic acid gas which is constantly evolving from all the tanks, vessels or places in which cyanid liquor is used or stored and which go to form the various units of a cyanid plant is continuously being regenerated into a simple cyanid solution and continuously being re-used in the process.

2. The improvement in the cyanid process for treating ores consisting in continuously collecting the gases from the agitator, filter, and extractor in which the ore is undergoing treatment, continuously passing the same to a regenerator wherein the hydrocyanic acid in the gases is constantly being converted into a simple cyanid solution, passing continuously this solution in to the solution collected in the sump and continuously pumping the solution from the sump back again into the agitator in which the ore is undergoing treatment.

3. The process for treating ores which consists in subjecting the ore to a cyanid solution in a treating tank, conducting the cyanid solution with the metals from the treating tank and introducing the same into an extractor when the metals are removed, then passing the used solution into a suitable vessel, collecting the gases liberated at the various stages of the process and conducting them continuously into a regenerating vessel, subjecting them to the action of an alkali to convert the hydrocyanic acid into a simple cyanid solution, conducting the cyanid solution so formed and introducing the same into the vessel containing the used cyanid solution and then discharging the combined solutions again into the treating tank.

4. The process for treating ore which consists in subjecting the ore to a cyanid solution in a treating tank, conducting the cyanid solution with the metals from the treating tank through a filter tank, introducing the solution and metals into an extractor when the metals are removed, passing the used cyanid solution into a suitable vessel, passing the solution into a feeding tank, collecting the gases formed in the treating tank, in the filter tank, in the extractor, in the vessel, and in the feeding tank, and discharging the same into a regenerating vessel, subjecting the same to the action of an alkali to convert the hydrocyanic acid into a simple cyanid solution, discharging the so formed solution into the vessel to commingle with the used cyanid solution therein, whereby the combined solutions are passed together into the feeding tank, and conducting the combined solutions from the feeding tank back into the treating tank.

In testimony whereof I affix my signature in presence of two witnesses.

HUGH M. LESLIE.

Witnesses:
H. D. FITZPATRICK,
MARGARET FINDLAY YOUNG.

Copies of this patent may be obtained for five cents each, by addressing the "Commissioner of Patents, Washington, D. C."